UNITED STATES PATENT OFFICE 2,375,868

PRESERVATIVE COMPOSITION AND METHOD

Max Vernon Noble, Kenmore, N. Y., assignor to E. I. du Pont de Nemours & Company, Wilmington, Del., a corporation of Delaware No Drawing. Application May 11, 1944, Serial No. 535,203

8 Claims. (Cl. 215—38)

This invention relates to the packaging of pellicles in the wet state, especially to maintaining gel cellulosic structures in normal condition. More particularly, it appertains to aqueous storage solutions which prevent bacteria, mold, and the like from attacking shrinkable regenerated cellulose caps and bands.

Shrinkable, non-fibrous secondary closures such as thimble-shaped caps (U. S. Patent No. 823,355 to Oliver), and tube-shaped bands for bottles, have been known and used extensively for a number of years. They provide an attractive decoration to the container, a deterrent against tampering with the contents thereof, and when suitably pigmented an effective background for printed advertising matter.

To seal a bottle, such a regenerated cellulose structure in gel form is placed over the bottle top and primary closure therefor and allowed to dry. The well known shrinkage which accompanies drying of (loss of water from) gel regenerated cellulose, results in the structure fitting into extremely firm engagement with the bottle neck and primary closure to form an attractive, tightly stretched, tough seal. Although this type of secondary closure may be produced by various procedures, the great bulk of present day production is manufactured by cutting short sections from continuous lengths of cellulose tubing regenerated from viscose. The manufacture of such tubes is described in detail in U. S. Patent No. 2,141,776 to Vautier and Fays. The cutting of such tubes into bands is described in U. S. Patent No. 1,647,489 to Webster.

After manufacture, the gel bands are customarily packed in liquid-tight containers together with sufficient solution including softener (usually glycerol) to maintain them in gel condition for shipment to the users, who simply apply them to the containers as above described.

The gel regenerated cellulose structures and the glycerol softener are very susceptible to attack by mold and bacteria. To prevent this attack and consequent deterioration of the bands, various preservative agents or compositions have been incorporated in the shipping solution. However, a satisfactory preservative must not only be effective to prevent the action of mold and bacteria but, in addition, it must be non-toxic, especially to the skin; it must be chemically inert with respect to the gel regenerated cellulose, other constituents of the shipping solution, and the container; it must be colorless; it must be stable; it must be compatible with the other constituents of the solution; it must not be objectionably odorous; it must be available; its effect must be reasonably lasting; and it must be economical. None of the preservatives heretofore proposed have satisfied all of these essential requirements.

The principal object of this invention, therefore, is to provide a shipping solution comprising an entirely satisfactory preservative composition for gel regenerated cellulose pellicles, that is, a solution which is efficient, colorless, not objectionably odorous, stable, non-irritating, readily available, inexpensive, lasting, which does not in any degree impair the qualities of the pellicles, and which will protect the pellicles from attack by bacteria and mold. This and other objects will more clearly appear hereinafter.

It has now been found that the above stated requirements are fully met, and hence the objects of this invention are realized, by a composition comprising essentially from about 0.03% to about 1.0% by weight of a compound from the group consisting of partially chlorinated petroleum hydrocarbon sodium sulfonate, dioctyl ester of sodium sulfosuccinic acid, dodecyl sodium sulfate, octadecenyl sodium sulfate, isopropylated naphthalene sodium sulfonate and dodecyl benzene sodium sulfate; from about 0.05% to about 0.2% of benzoic acid, from about 0.05% to about 3.0% of levulinic acid, from about 3% to 15% of softener, and the remainder being water.

Partially chlorinated petroleum hydrocarbon sodium sulfonate is the preferred compound from the group recited above as suitable for purposes of this invention. The preparation of the preferred agent is disclosed in U. S. Patent No. 2,197,800 to Henke and Lockwood. It is preferred to use about 0.1% of this compound or its equivalents in the shipping solution.

As softener, a mixture of glycerol and urea, preferably in equal amounts and totalling about 8% by weight of the total solution, is preferred. Glycerol alone has also given especially good results. However, any of the softeners known to the art for regenerated cellulose, and which are compatible with the other constituents of the composition may be used.

The following specific composition has proven particularly satisfactory:

| | Per cent |
|---|---|
| Partially chlorinated petroleum hydrocarbon sodium sulfonate (U. S. P. 2,197,800) | 0.1 |
| Benzoic acid | 0.1 |
| Levulinic acid | 1.0 |
| Glycerol | 4.0 |
| Urea | 4.0 |
| Water | 90.8 |

Regenerated cellulose pellicles packed in this shipping solution can be stored for from 3 to 12 months and longer without deterioration of the regenerated cellulose or softener, and unlike formaldehyde, parachlormetacresol and like agents heretofore employed the preservative agents of the present invention do not cause dermatitis and the user can therefore apply the bands or caps in the usual fashion without peril to his person. Furthermore, the solutions of this invention do not impart color to the pellicles, are not objectionably odorous, do not cause rusting when the wet bands are placed over metal caps often employed as the primary closure, and are readily available and inexpensive.

The property of shrinking upon drying, possessed by regenerated cellulose, has been taken advantage of in a number of uses other than the sealing of bottles, and the present invention is manifestly applicable to such fields.

As many apparently widely different embodiments of this invention may be made without departing from the spirit and scope thereof, it is to be understood that this invention is not limited to the specific embodiments thereof except as defined in the appended claims.

I claim:

1. A composition comprising essentially from about 0.03% to about 1.0% by weight, based on the weight of the composition, of a compound from the group consisting of partially chlorinated petroleum hydrocarbon sodium sulfonate, dioctyl ester of sodium sulfosuccinic acid, dodecyl sodium sulfate, octadecenyl sodium sulfate, isopropylated naphthalene sodium sulfonate, and dodecyl benzene sodium sulfate, from about 0.05% to about 0.2% of benzoic acid, from about 0.05% to about 3.0% levulinic acid, from about 3% to about 15% by weight of softener for regenerated cellulose, and the remainder of the composition being water.

2. A composition comprising essentially 0.1% by weight, based on the weight of the composition, of a compound from the group consisting of partially chlorinated petroleum hydrocarbon sodium sulfonate, dioctyl ester of sodium sulfosuccinic acid, dodecyl sodium sulfate, octadecenyl sodium sulfate, isopropylated naphthalene sodium sulfonate, and dodecyl benzene sodium sulfate, 0.1% of benzoic acid, 1.0% of levulinic acid, 3%–15% of softener for regenerated cellulose, and 83.8%–95.8% of water.

3. A composition comprising essentially 0.1% by weight, based on the weight of the composition, of partially chlorinated petroleum hydrocarbon sodium sulfonate, 0.1% of benzoic acid, 1.0% of levulinic acid, 4.0% of glycerol, 4.0% of urea, and 90.8% of water.

4. A gel regenerated cellulose pellicle impregnated with a composition comprising essentially from about 0.03% to about 1.0% by weight, based on the weight of the composition, of a compound from the group consisting of partially chlorinated petroleum hydrocarbon sodium sulfonate, dioctyl ester of sodium sulfosuccinic acid, dodecyl sodium sulfate, octadecenyl sodium sulfate, isopropylated naphthalene sodium sulfonate, and dodecyl benzene sodium sulfate, from about 0.05% to about 0.2% of benzoic acid, from about 0.05% to about 3.0% of levulinic acid, from about 3% to about 15% by weight of softener for regenerated cellulose, and the remainder of the composition being water.

5. A gel regenerated cellulose pellicle impregnated with a composition comprising essentially 0.1% by weight, based on the weight of the composition, of partially chlorinated petroleum hydrocarbon sodium sulfonate, 0.1% of benzoic acid, 1.0% of levulinic acid, 4.0% of glycerol, 4.0% of urea, and 90.8% of water.

6. The method of preserving gel regenerated cellulose pellicles which comprises packing said pellicles in a composition comprising essentially from about 0.03% to about 1.0% by weight, based on the weight of the composition, of a compound from the group consisting of partially chlorinated petroleum hydrocarbon sodium sulfonate, dioctyl ester of sodium sulfosuccinic acid, dodecyl sodium sulfate, octadecenyl sodium sulfate, isopropylated naphthalene sodium sulfonate, and dodecyl benzene sodium sulfate, from about 0.05% to about 0.2% of benzoic acid, from about 0.05% to about 3.0% of levulinic acid, from about 3% to about 15% by weight of softener for regenerated cellulose, and the remainder of the composition being water.

7. The method of preserving gel regenerated cellulose pellicles which comprises packing said pellicles in a composition comprising essentially 0.1% by weight, based on the weight of the composition, of a compound from the group consisting of partially chlorinated petroleum hydrocarbon sodium sulfonate, dioctyl ester of sodium sulfosuccinic acid, dodecyl sodium sulfate, octadecenyl sodium sulfate, isopropylated naphthalene sodium sulfonate, and dodecyl benzene sodium sulfate, 0.1% of benzoic acid, 1.0% of levulinic acid, 3%–15% of softener for regenerated cellulose, and 83.8%–95.8% of water.

8. The method of preserving gel regenerated cellulose pellicles which comprises maintaining said pellicles immersed in a composition comprising essentially 0.1% by weight, based on the weight of the composition, of partially chlorinated petroleum hydrocarbon sodium sulfonate, 0.1% of benzoic acid, 1.0% of levulinic acid, 4.0% of glycerol, 4.0% of urea, and 90.8% of water.

MAX VERNON NOBLE.